(12) United States Patent
Frenger et al.

(10) Patent No.: US 10,568,056 B2
(45) Date of Patent: Feb. 18, 2020

(54) METHOD OF ASSIGNING TRANSMISSION TIMING TO RADIO TERMINAL, RADIO NETWORK NODE AND RADIO TERMINAL

(71) Applicant: Telefonaktiebolaget LM Ericsson (publ), Stockholm (SE)

(72) Inventors: Pål Frenger, Linköping (SE); Emil Björnson, Linköping (SE); Martin Hessler, Linköping (SE); Giovanni Interdonato, Linköping (SE); Erik Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 78 days.

(21) Appl. No.: 15/521,404

(22) PCT Filed: Oct. 21, 2016

(86) PCT No.: PCT/EP2016/075369
§ 371 (c)(1),
(2) Date: Apr. 24, 2017

(87) PCT Pub. No.: WO2018/072842
PCT Pub. Date: Apr. 26, 2018

(65) Prior Publication Data
US 2018/0352526 A1  Dec. 6, 2018

(51) Int. Cl.
*H04W 56/00* (2009.01)
*H04B 7/0413* (2017.01)
*H04L 5/14* (2006.01)

(52) U.S. Cl.
CPC ... *H04W 56/0045* (2013.01); *H04W 56/0035* (2013.01); *H04B 7/0413* (2013.01); *H04L 5/14* (2013.01)

(58) Field of Classification Search
CPC ......... H04W 72/0446; H04W 72/0413; H04W 56/0055; H04W 72/042; H04W 88/06;
(Continued)

(56) References Cited

U.S. PATENT DOCUMENTS 6,388,997 B1 * 5/2002 Scott ............... H04B 7/2656
  370/280
6,693,883 B2 * 2/2004 Abe ............... H04B 7/2681
  343/913

(Continued)

OTHER PUBLICATIONS

International Search Report and Written Opinion for International Patent Application No. PCT/EP2016/075369, dated Jul. 14, 2017, 13 pages.
(Continued)

*Primary Examiner* — Siming Liu
(74) *Attorney, Agent, or Firm* — Withrow & Terranova, PLLC

(57) ABSTRACT

The present invention relates to a method of assigning a transmission timing to a radio terminal in a radio network system including at least a radio network node and a radio terminal and employing a time division duplex method dividing a transmission time in an uplink transmission time interval and a downlink transmission time interval for transmission between the radio network node and the radio terminal, comprising the following steps: determining a speed of movement of the radio terminal with respect to the radio network node; assigning to the radio terminal, based on the speed of movement, a transmission timing in the downlink or uplink transmission time interval. The present invention relates further to a radio network node and a radio terminal adapted to assigning a transmission timing according to the above method.

12 Claims, 9 Drawing Sheets

(58) Field of Classification Search
CPC ............... H04W 56/0045; H04W 56/0035; H04L 5/14; H04L 5/0078; H04B 7/0413
See application file for complete search history.

(56) References Cited

U.S. PATENT DOCUMENTS

| | | | | |
|---|---|---|---|---|
| 6,944,454 B1* | 9/2005 | Lee | .............. | H04B 7/2606 455/443 |
| 7,031,371 B1* | 4/2006 | Lakkis | .............. | H04B 1/71635 375/130 |
| 7,263,338 B2* | 8/2007 | Denk | .............. | H04B 7/269 375/295 |
| 7,773,566 B2* | 8/2010 | Proctor, Jr. | .............. | H04B 1/7085 370/329 |
| 8,306,174 B2* | 11/2012 | Murphy | .............. | H04W 56/0045 375/371 |
| 8,600,420 B2* | 12/2013 | Lee | .............. | H04L 27/2646 370/330 |
| 2005/0157694 A1* | 7/2005 | Lu | .............. | H04J 3/1694 370/345 |
| 2010/0027729 A1* | 2/2010 | Murphy | .............. | H04W 56/0045 375/371 |
| 2014/0050186 A1* | 2/2014 | Kim | .............. | H04W 56/0045 370/329 |
| 2014/0086219 A1 | 3/2014 | Suzuki et al. | | |
| 2014/0254468 A1* | 9/2014 | Raaf | .............. | H04W 56/003 370/315 |
| 2015/0334707 A1 | 11/2015 | Rajagopalan et al. | | |
| 2016/0095091 A1* | 3/2016 | Chin | .............. | H04W 72/042 370/329 |

OTHER PUBLICATIONS

International Preliminary Report on Patentability for International Patent Application No. PCT/EP2016/075369, dated Jan. 25, 2019, 17 pages.

* cited by examiner

| PARAMETER | VALUE |
|---|---|
| $M$ | 100 |
| $K$ | 20 (10 low-speed UE, 10 high-speed UE) |
| Speed | 1.5 m/s low-speed UE, 30 m/s high-speed UE |
| $\tau$ | 15000 low-speed UE, 750 high-speed UE symbols |
| Coherence Bandwidth $B_c$ | 300 kHz |
| Coherence Time $T_c$ | 50 ms low-speed UE, 2.5 ms high-speed UE |
| TTI | 7499 symbols |
| $\tau_{SRS}$ | 2 symbols |
| $\tau_{DL}, \tau_{UL}$ | 7495 symbols |
| Carrier Frequency | 2 GHz |
| SNR | 10 dB low-speed UE, 20 dB high-speed UE |
| SRS periodicity | 1/TTI |

METHOD OF ASSIGNING TRANSMISSION TIMING TO RADIO TERMINAL, RADIO NETWORK NODE AND RADIO TERMINAL

This application is a 35 U.S.C. § 371 national phase filing of International Application No. PCT/EP2016/075369, filed Oct. 21, 2016, the disclosure of which is incorporated herein by reference in its entirety.

TECHNICAL FIELD

The present invention relates to method of assigning a transmission timing to a radio terminal in a radio network system including at least a radio network node and a radio terminal and employing a time division duplex method dividing a transmission time in an uplink transmission time interval and a downlink transmission time interval for transmission between the radio network node and the radio terminal. The present invention relates further to a respective radio network node and a radio terminal.

BACKGROUND

In a radio network system a radio terminal typically transmits a control signal in an uplink transmission to a radio network node. Such a control signal may contain information about the quality of a connection between the radio terminal and the radio network node. In particular, the radio terminal may transmit a channel quality indicator indicating the quality of the radio connection between the radio terminal and the radio network node.

This information on the quality of the connection between the radio terminal and the radio network node is then used at the network node for scheduling further transmission in the uplink and a downlink between the radio terminal and the radio network node.

In this context reciprocity based time division duplex (TDD) systems are of particular interest for future radio network systems such as 5G, since for instance a massive multiple-input multiple-output (MIMO) system, which is a candidate technology for the fifth generation new radio physical layer, may operate in TDD mode.

Massive MIMO, also known as large-scale antenna systems and very large MIMO, is a multi-user MIMO technology where each radio network node may be equipped with a large number of antenna elements, which may be used to serve many radio terminals that share a same time and frequency band and may be separated in a spatial domain. A good assumption is that there are more or even many more BS antennas than terminals, but ideally as many as possible.

Massive MIMO offers many benefits over conventional multi-user MIMO. First, conventional multi-user MIMO is not a scalable technology, since it has been designed to support systems with roughly equal numbers of service antennas and terminals, and relies on frequency-division duplex (FDD) operation.

By contrast, in massive MIMO, the large excess of service antennas over active terminals, TDD operation brings huge improvements in throughput and radiated energy efficiency. These benefits result from spatial multiplexing achieved by appropriately shaping signals sent out and received by the radio network node antennas.

By applying precoding to all antennas the radio network node may cause constructive interference among signals at the locations of the intended radio terminals, and destructive almost everywhere else. Furthermore, as the number of antennas increases, the energy may be focused with high precision into small regions in space.

Other benefits of massive MIMO include use of simple low-power components since it relies on simple signal processing techniques, reduced latency, and robustness against intentional jamming.

By operating in TDD mode, massive MIMO exploits a channel reciprocity property, according to which the channel responses may be the same in both uplink and downlink.

This channel reciprocity may allow the radio network nodes to acquire channel state information (CSI) from pilot sequences transmitted by the terminals in the uplink, and this CSI may be then useful for both the uplink and the downlink, as shown in FIG. 5. In this respect, a pilot sequence may refer to a pattern of reference signals within the used transmission resources.

By virtue of the law of large numbers, the effective scalar channel gain seen by each terminal may be close to a deterministic constant. This may be called channel hardening.

Thanks to channel hardening, the terminals may reliably decode the downlink data using only long-term statistical CSI, making most of the physical layer control signaling redundant, i.e. low-cost CSI acquisition. This may render the conventional resource allocation concepts unnecessary and results in a simplification of the Media Access Control MAC layer. These benefits may have elevated massive MIMO to a good position in preliminary future network system discussions.

However, massive MIMO system performances are affected by some limiting factors. For instance channel reciprocity may require hardware calibration. Further, a so called pilot contamination effect is a basic phenomenon which may profoundly limit the performance of massive MIMO systems. Theoretically, every terminal in a massive MIMO system could be assigned an orthogonal uplink pilot sequence. However, the maximum number of orthogonal pilot sequences that can exist may be upper-bounded by the size of the coherence interval, which may be the product of a coherence time and coherence bandwidth, i.e. the product of the coherence time, i.e. the time duration over which the uplink pilot sequence may be considered unchanged or not varying within a certain range, and the coherence bandwidth, i.e. a statistical measurement of a range of frequencies over which the pilot sequence may be considered flat, or in other words an approximate maximum bandwidth or frequency interval over which two frequencies of the pilot sequence are likely to experience comparable or correlated amplitude fading.

Hence, adopting orthogonal pilot sequences may lead to inefficient resource allocation as the number of the terminals increases or it may not physically be possible to perform when the coherence interval is too short.

As a consequence, pilot sequences may be reused across cells of the radio network system or even within a home cell for instance for higher cell density. This may cause interference among terminals which share the same pilot.

Pilot contamination does not vanish as the number of radio network node antennas grows large, and so it is one impairment that remains asymptotically.

Further, reciprocity based beamforming may rely on accurate channel state information at a transmitter (CSI-T) such as the radio terminal. In case the number of transmit antennas is significantly larger than the number of receive antennas, as is the case in TDD massive MIMO downlink scenario, then the CSI-T may be efficiently obtained by transmission of SRS in the reverse link, i.e. in the direction from the radio terminal to the network node.

The required periodicity of SRS may depend on a coherence time of the radio channel, which in turn depends on the speed of movement of the radio terminal.

Therefore, there is the need to ensure the required periodicity of SRS in a radio network system.

Thus, an object of the present invention is to ensure accurate transmission quality information is used when transmission timing is assigned to a radio terminal. Another object of the present invention is to enable reciprocity based acquisition of transmission quality information for assigning transmission timing to a radio terminal.

Yet another object of the present invention is to reduce the reference signal overhead for assigning transmission timing to a radio terminal.

SUMMARY

The above-mentioned problems and drawbacks of the conventional methods are solved by the subject matter of the independent claims. Further preferred embodiments are described in the dependent claims.

According to an aspect of the present invention there is provided a method of assigning a transmission timing to a radio terminal in a radio network system including at least a radio network node and a radio terminal and employing a time division duplex method dividing a transmission time in an uplink transmission time interval and a downlink transmission time interval for transmission between the radio network node and the radio terminal. The method comprises the following steps of determining a speed of movement of the radio terminal with respect to the radio network node, and assigning to the radio terminal, based on the speed of movement, a transmission timing in the downlink or uplink transmission time interval.

According to another aspect of the present invention there is provided a radio network node for a radio network system including at least the radio network node and a radio terminal and employing a time division duplex method dividing a transmission time in an uplink transmission time interval and a downlink transmission time interval for transmission between the radio network node and the radio terminal. The radio network node is adapted to determine a speed of movement of the radio terminal with respect to the radio network node, and assign to the radio terminal, based on the speed of movement, a transmission timing in the downlink or uplink transmission time interval.

According to another aspect of the present invention there is provided a radio terminal for a radio network system including at least a radio network node and the radio terminal and employing a time division duplex method dividing a transmission time in an uplink transmission time interval and a downlink transmission time interval for transmission between the radio network node and the radio terminal. The radio terminal is adapted to receive an assigned transmission timing; refrain from transmitting in the downlink transmission time interval until an assigned transmission timing; transmit only during the assigned transmission timing of the downlink transmission time interval; and refrain from transmitting in a remaining part of the downlink transmission time interval.

According to another aspect of the present invention a computer program is provided that comprises code, the code, when executed on processing resources, instructs the processing resources to perform a method embodiment of the present invention.

According to yet another aspect of the present invention a computer program product is provided that stores a code, the code, when executed on processing resources, instructs the processing resources to perform a method embodiment of the present invention.

The present disclosure is applicable for all systems based on TDD beamforming systems, and downlink channel state information (CSI) acquisition via channel reciprocity based on uplink sounding reference signal (SRS) sent by users. A natural application of this disclosure would be massive MIMO systems of 5G.

BRIEF DESCRIPTION OF THE DRAWINGS

Embodiments of the present invention, which are presented for better understanding the inventive concepts but which are not to be seen as limiting the invention, will now be described with reference to the figures in which.

DETAILED DESCRIPTION OF PREFERRED EMBODIMENTS

Figure 1:
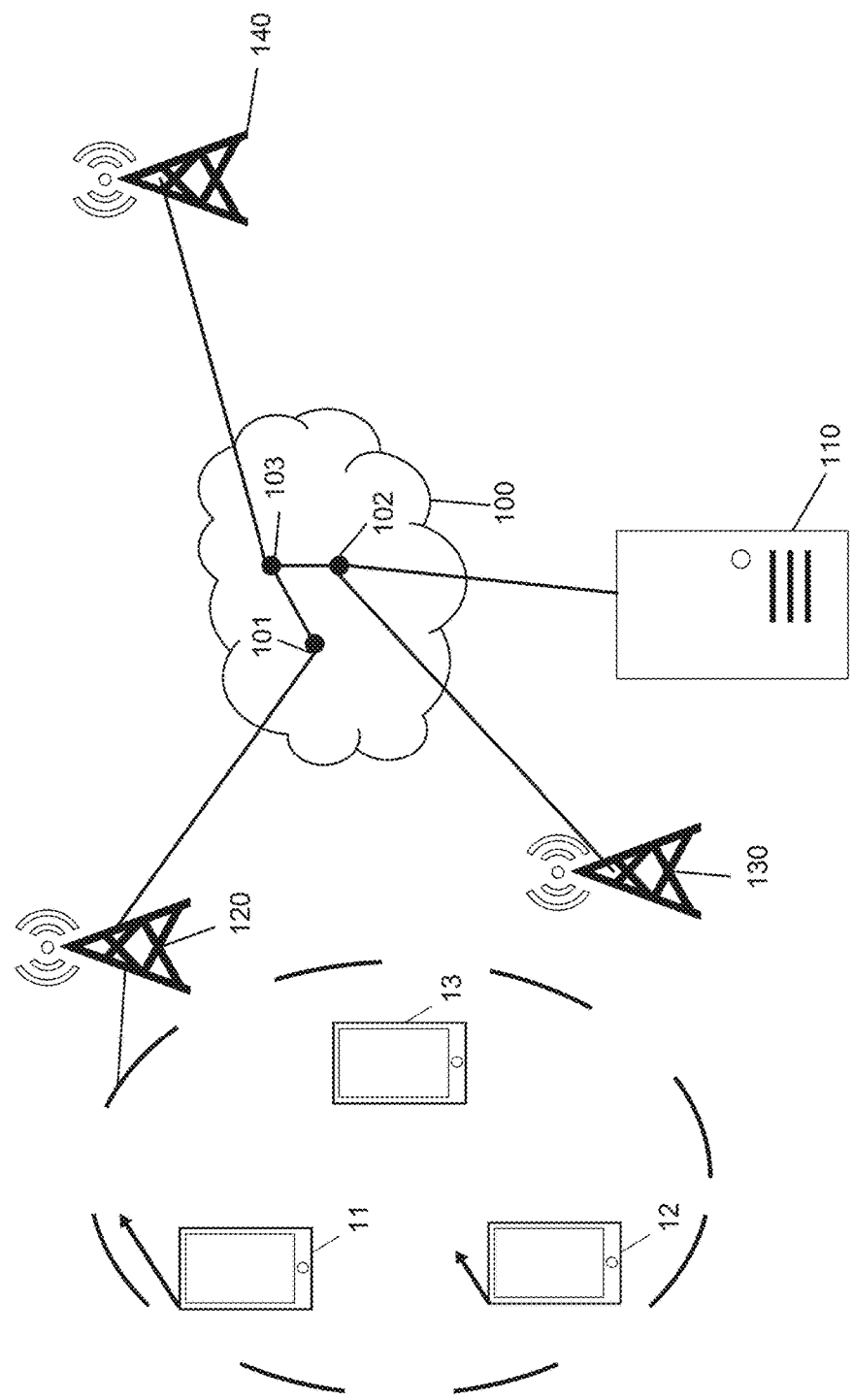
FIG. 1 shows a schematic overview of an exemplary network environment in which radio terminals moving at different speeds are served by at least one radio network node.

FIG. 1 shows a schematic overview of an exemplary network environment. A network 100, for instance a radio network system or a radio communication network, includes a number of network elements 101-103 such as network nodes, routers, gateways, switches, switching centers, base stations, wire-less or wire-bound links, and the like. In general, the purpose of the network 100 will be to provide a network service to a plurality of radio terminals 11, 12, 13 where the usual services include, telephony, video-telephony, chatting, internet browsing, email access, and the like. For this purpose the network elements 101-103 will convey data via radio network nodes 120, 130, 140 to and from the plurality of radio terminals 11, 12, 13. The radio network nodes 120, 130, 140 may communicate with the individual radio terminals 11, 12, 13 via the usual radio links for transmitting and receiving data to and from a radio terminal 11, 12, 13. The network 100 may further have a connection to some sort of network entity 110, such as a server or a resource in a data center. The network entity 110 may also have a direct link to any one of the radio network 120, 130, 140 or the radio terminals 11, 12, 13.

The radio terminals 11, 12, 13 may move at different speeds as indicated by an arrow on top of the radio terminal 11, 12, 13. Note the longer the arrow indicated on the radio terminal 11, 12, 13, the faster the speed of movement. For instance, the radio terminal 11 is moving at a high speed and may be for instance in a high-speed train, an airplane, a vehicle on a highway, or the like. The radio terminal 12 is moving at a moderate speed and may be for instance in a slow-moving vehicle such as an automobile or bus on a regular street, a bicycle or the like. The radio terminal 13 is not moving and in a steady location.

According to embodiments, a radio terminal transmission timing in a transmission time interval, TTI, is assigned based on the speed of movement of the respective radio terminal. The transmission time interval maybe a downlink transmission time interval, DL TTI, or a uplink transmission time interval, UL TTI, i.e. the DL TTI or UL TTI may be a duration of transmission for instance in a radio link between a radio network node and a radio terminal.

According to at least one embodiment of the present invention the transmission timing assigned to a radio terminal moving at a high speed may be before a switching symbol, i.e. a point in time in the DL or UL TTI that separates the radio terminal being transmitting from the radio terminal being silent. On the other hand the transmission timing assigned to a radio terminal moving at a low speed may be after a switching symbol.

In particular, the radio terminal may be also referred to without loss of generality as a wireless terminal, a mobile terminal, radio terminal device, a user equipment UE, and the like. The radio terminal may be a mobile phone, a mobile tablet PC, or any other wireless communication device connected to the radio network system.

The required periodicity of reference signaling such as a sounding reference signal SRS depends on a coherence time of a transmission timing of a radio channel, which in turn depends on a speed of the radio terminal such as the UE. High speed radio terminals need a high periodicity of SRS transmissions and low speed radio terminals are better served by lower SRS periodicity.

A system employing time division duplex TDD may be considered. That is, for instance a single frequency band for uplink and downlink, i.e., from the perspective of the radio terminal, transmit and receive, may be used. Then that band may be shared by assigning alternating time slots to transmit and receive operations.

In a conventional time division duplex TDD system serving a multitude of radio terminals a network may need to select one single SRS periodicity that might only be optimum for radio terminals with a particular channel coherence time, and sub-optimum for all other radio terminals.

When reverting the channel from downlink to uplink to enable radio terminals to transmit SRS the base station may need to be quiet, i.e. may not transmit. Furthermore, the radio network node may need to insert additional guard intervals in a time domain to account for a propagation delay which may further increase a cost of transmitting a SRS. In a multi-cell TDD system the SRS periodicity selection in one radio network node may be affected by SRS periodicity selection in a nearby radio network node. Typically, the same SRS pattern may need to be used also in surrounding radio network nodes to avoid problematic interference situations.

The selection of SRS periodicity in a radio network may therefore be a trade-off. That is, high SRS periodicity may provide good performance for high speed radio terminals at the cost of high SRS overhead for low speed radio terminals. However, low SRS periodicity suffers from channel state information at a transmitter CSI-T aging of high speed radio terminal, i.e. the transmitted information is quickly outdated as the radio terminal moves quickly, which leads to a significant signal-to-interference-plus-noise ratio (SINR) degradation, but results in good performance for low speed radio terminals.

In the above method according to the prior art it is hence not possible to select an SRS periodicity that will be optimal for all radio terminals in the network. However, the present invention addresses the above mentioned shortcomings of the prior art.

Figure 2:
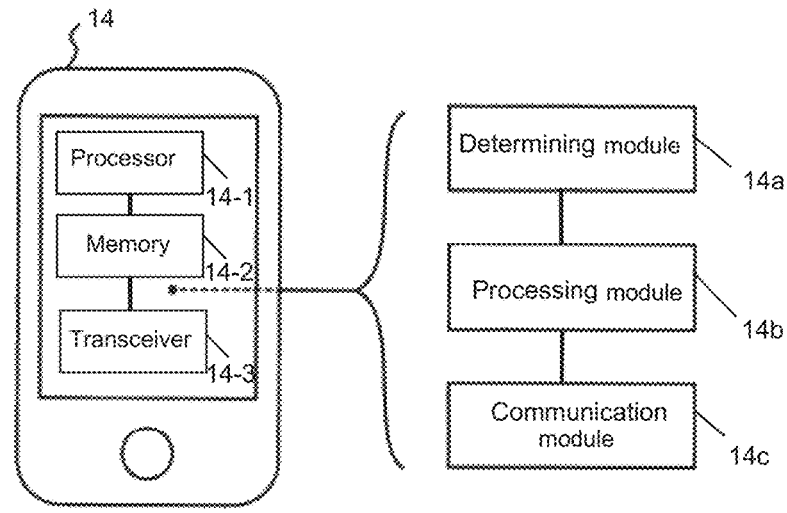
FIG. 2 shows a radio terminal adapted to a method according to one embodiment of the present invention for assigning transmission timing.

FIG. 2 shows a radio terminal 14 adapted to perform a method according to the present invention. The radio terminal 14 may correspond to one of the radio terminals 11, 12, 13 shown in FIG. 1.

The radio terminal 14 is for a radio network system including at least a radio network node, for example one of the radio network nodes 120, 130, 140 shown in FIG. 1, and the radio terminal 14 and employing a time division duplex method. This method divides a transmission time in an uplink transmission time interval and a downlink transmission time interval for transmission between the radio network node and the radio terminal. The radio terminal 14 is adapted to receive an assigned transmission timing, refrain from transmitting in the downlink transmission time interval until an assigned transmission timing, transmit only during the assigned transmission timing of the downlink transmission time interval, and refrain from transmitting in the remaining part of the downlink transmission time interval.

That is, in other words, the radio terminal 14 may receive an assignment indicating a transmission window or transmission timing, e.g. encoded as a starting time and a stopping time, where said transmission window is part of a downlink transmission time interval. Thus, when the radio terminal 14 receives an assignment for a downlink transmission it may not start transmitting immediately, when the downlink transmission time interval starts, and may transmit until the end of the transmission time interval.

In a first embodiment shown on the left hand side of FIG. 2, the radio terminal 14 may include at least one processor 14-1, a memory 14-2, and a transceiver 14-3 with receiving and transmitting capabilities. The at least one processor is coupled to the memory and the transceiver. A computer program code comprising code is stored in the memory. The code is executable by the at least one processor. When the at least one processor executes the code, the radio terminal 14 is caused to perform the above described steps which are explained in more detail below.

In a second embodiment shown in the right hand side of the Figure, the radio terminal 14 includes determining module 14a, processing module 14b, and communication module 14c.

In one embodiment of the present invention, the radio terminal 14 may be capable of determining a speed of movement with respect to the radio network node using for instance sensors. For instance the radio terminal 14 may use determining module 14a such as a gyroscope or an optical camera to determine its relative speed. The radio terminal 14 may then further use processing module 14b to carry out a determining process of the speed of movement and may further use communication module 14c to communicate the determined speed of movement to a serving radio network node.

Figure 3:
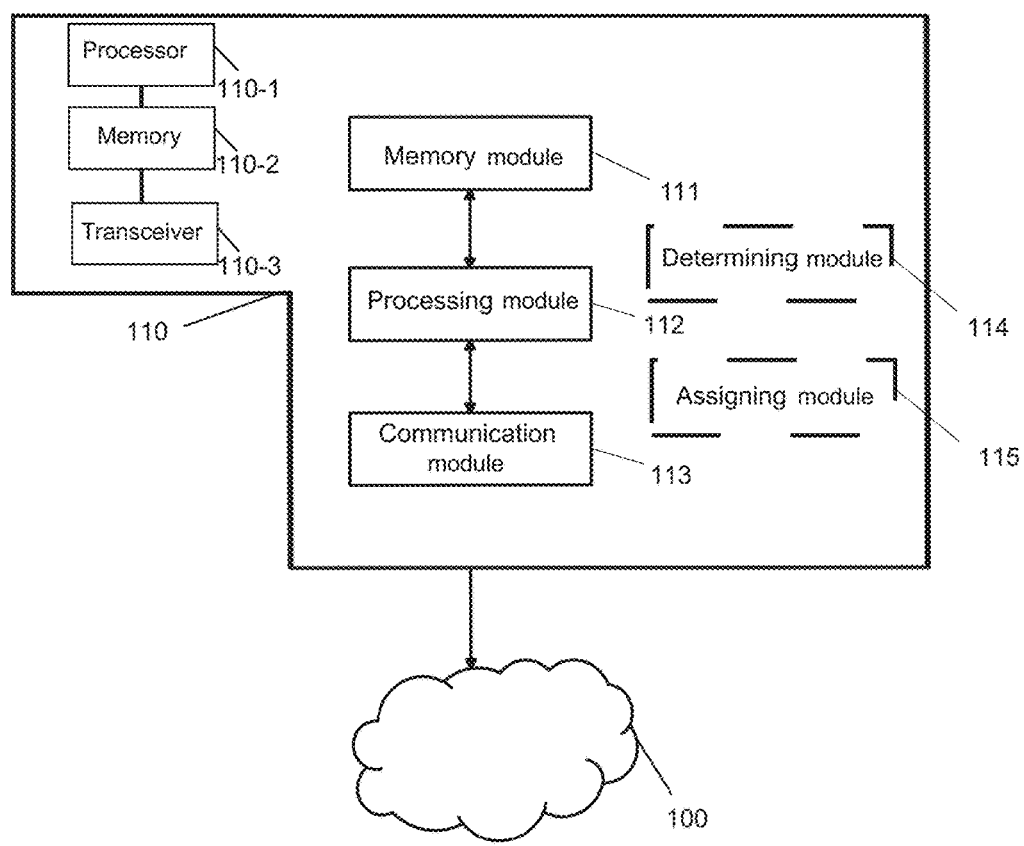
FIG. 3 shows a general entity embodiment of the invention for assigning a transmission timing to a radio terminal.

FIG. 3 shows a general network node embodiment of the invention for assigning transmission timing to the radio terminal, for example one of the radio terminals 11, 12, 13, 14. The network node may correspond to the network nodes 120, 130, 140 described in FIG. 1.

In particular, the network node 110 may be adapted to perform a method according to one embodiment of the present invention. That is, according to one embodiment of the invention the network node 110 may be provided with memory module 111, processing module 112, communication module 113, determining module 114, and assigning module 115. In another embodiment according to the present invention the network node 110, i.e. network node 120, 130, 140, may include at least one processor 110-1, a memory 110-2, and a transceiver 110-3 with receiving and transmitting capabilities as illustrated on the left side of FIG. 3. The at least one processor is coupled to the memory and the transceiver. A computer program code comprising code is stored in the memory. The code is executable by the at least one processor. When the at least one processor executes the code, the radio terminal 14 is caused to perform the above described steps which are explained in more detail below.

In other words according to one embodiment of the present invention the present invention relates to a radio network node for a radio network system including at least the radio network node and a radio terminal and employing a time division duplex method dividing a transmission time in an uplink transmission time interval and a downlink transmission time interval for transmission between the radio network node and the radio terminal, the radio network node comprising a module adapted to determine a speed of movement of the radio terminal with respect to the radio network node; and a module adapted to assign to the radio terminal, based on the speed of movement, a transmission timing in the downlink or uplink transmission time interval.

Generally, the mentioned processing module 112 may be a processing unit, a processing unit collection, CPU, a share of a data processing center and so on. However, the identifying module 114 and the determining module 115 may be provided within the processing module 112 or may be connected to either one of the memory module 111, processing module 112, or communication module 113.

The memory module 111 may specifically store code instructing the processing module 112 during operation to implement any method embodiment of the present invention.

For instance in one embodiment of the present invention the network entity 110 may be a radio network node such as a base station, an eNodeB, a gNode, a gateway, an external processing entity or the like.

Figure 4:
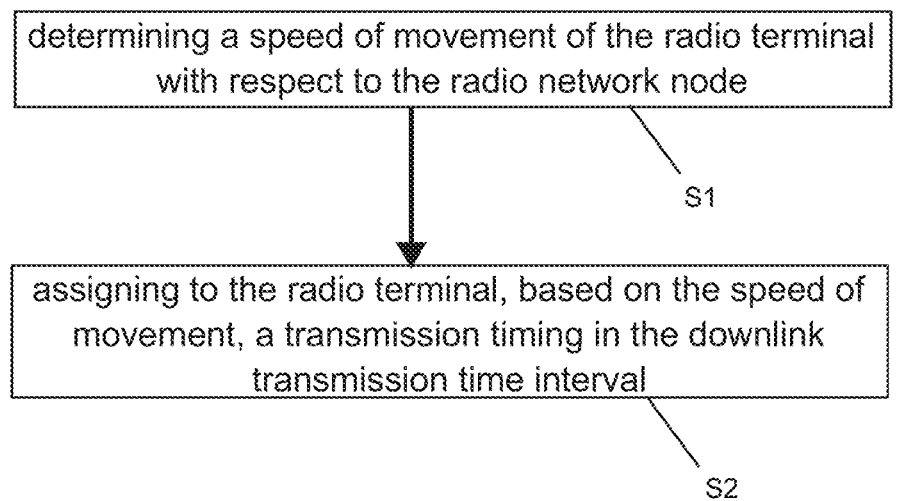
FIG. 4 shows a flowchart of a general method embodiment of the present invention.
Figure 5:
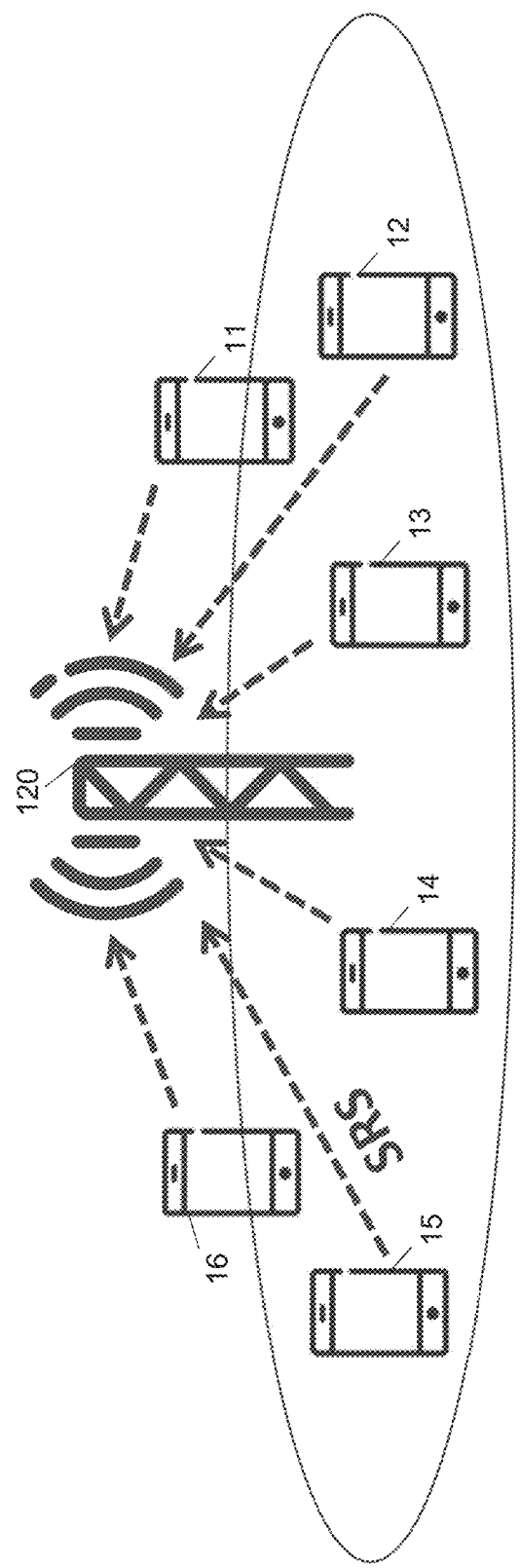
FIG. 5 shows an exemplary channel state information acquisition at the radio network node via reference signaling.

FIG. 4 shows a flowchart of a general method embodiment of the present invention. According to one embodiment of the present invention the speed of movement of the radio terminal 11, 12, 13, 14, 15, 16 may be determined with respect to a radio network node 110, 120, 130, 140 (S1). Further, the radio network node may assign based on the determined speed of movement a transmission timing in a transmission time interval such as the downlink or uplink transmission time interval (S2). In this respect, the transmission timing may correspond to a time window within the downlink or uplink time interval.

According to one embodiment of the present invention in assigning to the radio terminal 11, 12, 13, 14, 15, 16 the transmission timing, the higher the speed of movement of the radio terminal 11, 12, 13, 14, 15, 16, the earlier is the transmission timing within the downlink or uplink transmission time interval.

According to yet another embodiment of the present invention in assigning to the radio terminal 11, 12, 13, 14, 15, 16 the transmission timing, the radio terminal 11, 12, 13, 14, 15, 16 with a speed of movement lower than a threshold is assigned a transmission timing throughout the entire downlink or uplink transmission time interval.

That is, a radio terminal 11, 12, 13, 14, 15, 16 that is in a steady location such as the radio terminal 13 in FIG. 1 may be assigned a transmission timing throughout the entire downlink or uplink transmission time interval. With respect to the threshold that should be determined in advance it may be that the radio terminal 12 moving at a moderate speed may also be assigned a transmission timing throughout the entire downlink or uplink transmission time interval. Thus, the signaling overhead may be reduced for radio terminals 11, 12, 13, 14, 15, 16 moving at a speed lower than the threshold.

In other words according to one embodiment of the present invention, the low-speed radio terminals 11, 12, 13, 14, 15, 16 may be served during the entire downlink part of the transmission time interval TTI, instead of only during its later part. That is, the low-speed radio terminals 11, 12, 13, 14, 15, 16 receive service in the whole downlink interval whereas the high-speed radio terminals 11, 12, 13, 14, 15, 16 receive service only in the earlier part.

In particular, if one or more low-speed radio terminals 11, 12, 13, 14, 15, 16 have a strong channel and a max-min SINR power control is applied, these low-speed radio terminals 11, 12, 13, 14, 15, 16 may consume only a small part of the total emitted downlink power and can in that respect be served almost without extra costs, i.e. for free. Serving these low-mobility radio terminals 11, 12, 13, 14, 15, 16 during the entire downlink interval may entail optimal operation due to a gain of degrees of freedom.

In addition, the radio network node 110, 120, 130, 140 may likely have better estimates of the CSI to the low-mobility radio terminals 11, 12, 13, 14, 15, 16 due to their longer channel coherence and hence zero-forcing or MMSE beamforming techniques may function well in suppressing interference to them when beamforming to the high-mobility radio terminals 11, 12, 13, 14, 15, 16.

The network may assign additional power to the low speed radio terminals 11, 12, 13, 14, 15, 16 in the latter part of the TTI when it is no longer serving the high speed radio terminals 11, 12, 13, 14, 15, 16. The network may inform the mobile terminals 11, 12, 13, 14, 15, 16 about the power of the first and second part of the TTI, e.g. in order to enable accurate soft bit reliability calculations and channel estimation in the radio terminal.

According to another embodiment of the present invention in assigning to the radio terminal 11, 12, 13, 14, 15, 16 the transmission timing, the higher the speed of movement of the radio terminal 11, 12, 13, 14, 15, 16, the closer the transmission timing for reference signals is to the transmission timing of the downlink transmission timing.

That is, downlink reference signals, also referred to as pilots, may be used to aid the demodulation at the radio terminals 11, 12, 13, 14, 15, 16. When for instance serving a mix of high-mobility and low-mobility radio terminals 11, 12, 13, 14, 15, 16, i.e. radio terminals 11, 12, 13, 14, 15, 16 moving at a high speed and radio terminals 11, 12, 13, 14, 15, 16 moving at a low speed, the frequency of the downlink pilots may be adapted so that high-mobility radio terminals 11, 12, 13, 14, 15, 16 receive pilot symbols more often than the low-mobility radio terminals 11, 12, 13, 14, 15, 16.

Time-variation of the channel may cause the CSI to be outdated both at the network node 110, 120, 130, 140, e.g. base station, and at the radio terminal 11, 12, 13, 14, 15, 16. This effect of this outdating may be worse at the radio terminal 11, 12, 13, 14, 15, 16 than at the base station, due to averaging over the antennas. In particular, a random phase rotation of the channel coefficient at each per base station antenna may average out due to the law of large numbers: the effective channel gain after beamforming may involve a weighted sum of all channel coefficients, and perturbations to these coefficients may average out in the sum. In contrast, a phase rotation of the received symbol constellation at the radio terminal 11, 12, 13, 14, 15, 16 may not be subject to such averaging and may result in severe performance degradation. Therefore, according to one embodiment of the present invention the higher the speed of movement of the radio terminal 11, 12, 13, 14, 15, 16, the closer the transmission timing for reference signals is to the transmission timing of the downlink transmission timing.

According to another embodiment of the present invention in assigning to the radio terminal 11, 12, 13, 14, 15, 16 the transmission timing, the radio terminal 11, 12, 13, 14, 15, 16 with a speed of movement lower than a threshold is assigned a transmission timing for uplink reference signals throughout the entire uplink transmission time interval.

That is, the placement of uplink pilots such as SRS may be adapted depending on the radio terminal mobility. For radio terminals 11, 12, 13, 14, 15, 16 interested in good uplink service or both uplink and downlink service, spreading the pilots over the entire uplink interval, interleaved with data symbols, may be advantageous.

On the other hand, for radio terminals 11, 12, 13, 14, 15, 16 primarily interested in downlink service high-mobility radio terminals 11, 12, 13, 14, 15, 16 may see a channel coherence time shorter than a transmission time interval TTI. Their uplink pilots may then preferably be scheduled immediately before the downlink interval starts, as the possibility to usefully extrapolate the channel response is limited. The low-mobility radio terminals 11, 12, 13, 14, 15, 16 on the other hand may have a coherence time that is longer than a TTI. Their uplink pilots may then be spread over the entire uplink part of the TTI that is, actually over the SRS part of the current TTI and the uplink payload part of the previous TTI, to facilitate highly accurate channel extrapolation during the downlink part.

According to yet another embodiment of the present invention the radio network system is a Multiple-Input Multiple-Output system or a massive Multiple-Input Multiple-Output system and the method further includes employing the time division duplex method dividing the transmission time in the uplink transmission time interval and the downlink transmission time interval for transmission between the radio network node 110, 120, 130, 140 and the radio terminal 11, 12, 13, 14, 15, 16.

Figure 6:
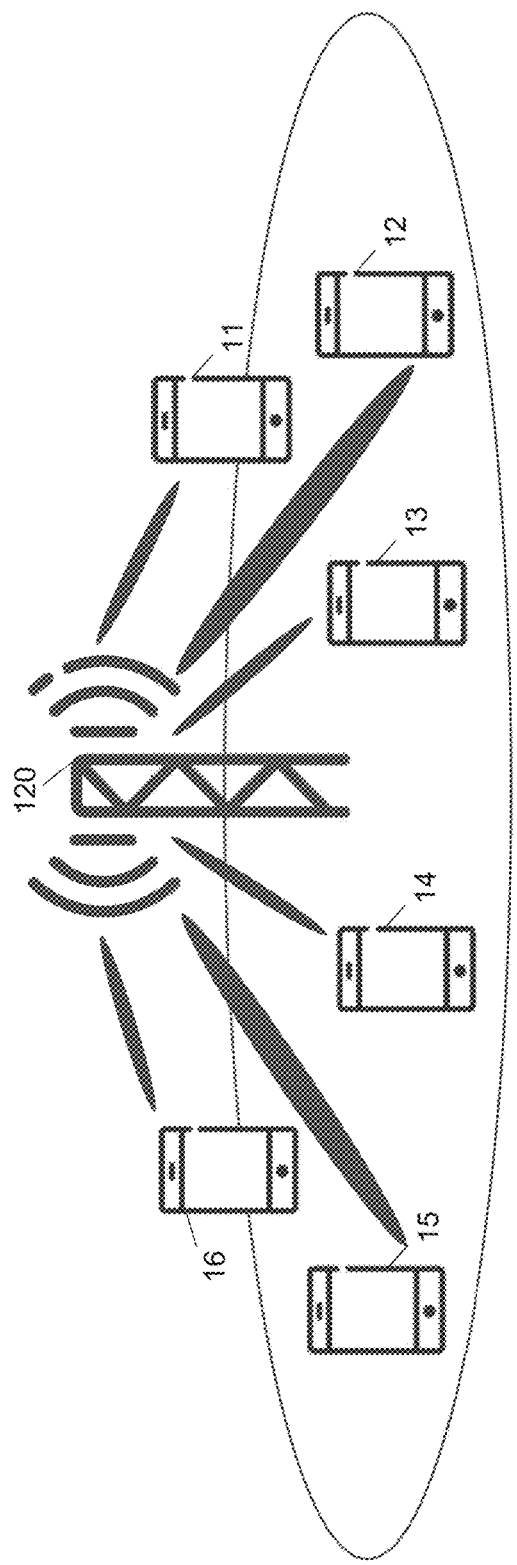
FIG. 6 shows an exemplary embodiment of reciprocity based beamforming in a multiple input multiple output MIMO system.

FIG. 6 shows an exemplary embodiment of reciprocity based beamforming in a multiple input multiple output MIMO system.

Massive MIMO, also known as large-scale antenna systems and very large MIMO, is a multi-user MIMO technology where each radio network node (BS) may be equipped with a large number of antenna elements, which may be used to serve many radio terminals 11, 12, 13, 14, 15, 16 that share a same time and frequency band and may be separated in a spatial domain. A good assumption is that there are more or even many more BS antennas than terminals; but ideally as many as possible.

Massive MIMO offers many benefits over conventional multi-user MIMO. First, conventional multi-user MIMO is not a scalable technology, since it has been designed to support systems with roughly equal numbers of service antennas and terminals, and relies on frequency-division duplex (FDD) operation.

By contrast, in massive MIMO, the large excess of service antennas over active terminals, TDD operation brings huge improvements in throughput and radiated energy efficiency. These benefits result from spatial multiplexing achieved by appropriately shaping signals sent out and received by the radio network node antennas.

By applying precoding to all antennas the radio network node 110, 120, 130, 140 may cause constructive interference among signals at the locations of the intended radio terminals 11, 12, 13, 14, 15, 16, and destructive almost everywhere else. Furthermore, as the number of antennas increases, the energy may be focused with high precision into small regions in space.

Other benefits of massive MIMO include use of simple low-power components since it relies on simple signal processing techniques, reduced latency, and robustness against intentional jamming.

By operating in TDD mode, massive MIMO exploits a channel reciprocity property, according to which the channel responses may be the same in both uplink and downlink.

According to yet another embodiment of the present invention the speed of the radio terminal 11, 12, 13, 14, 15, 16 is determined using an uplink transmission from the radio terminal 11, 12, 13, 14, 15, 16 to the radio network node 110, 120, 130, 140.

Figure 7:
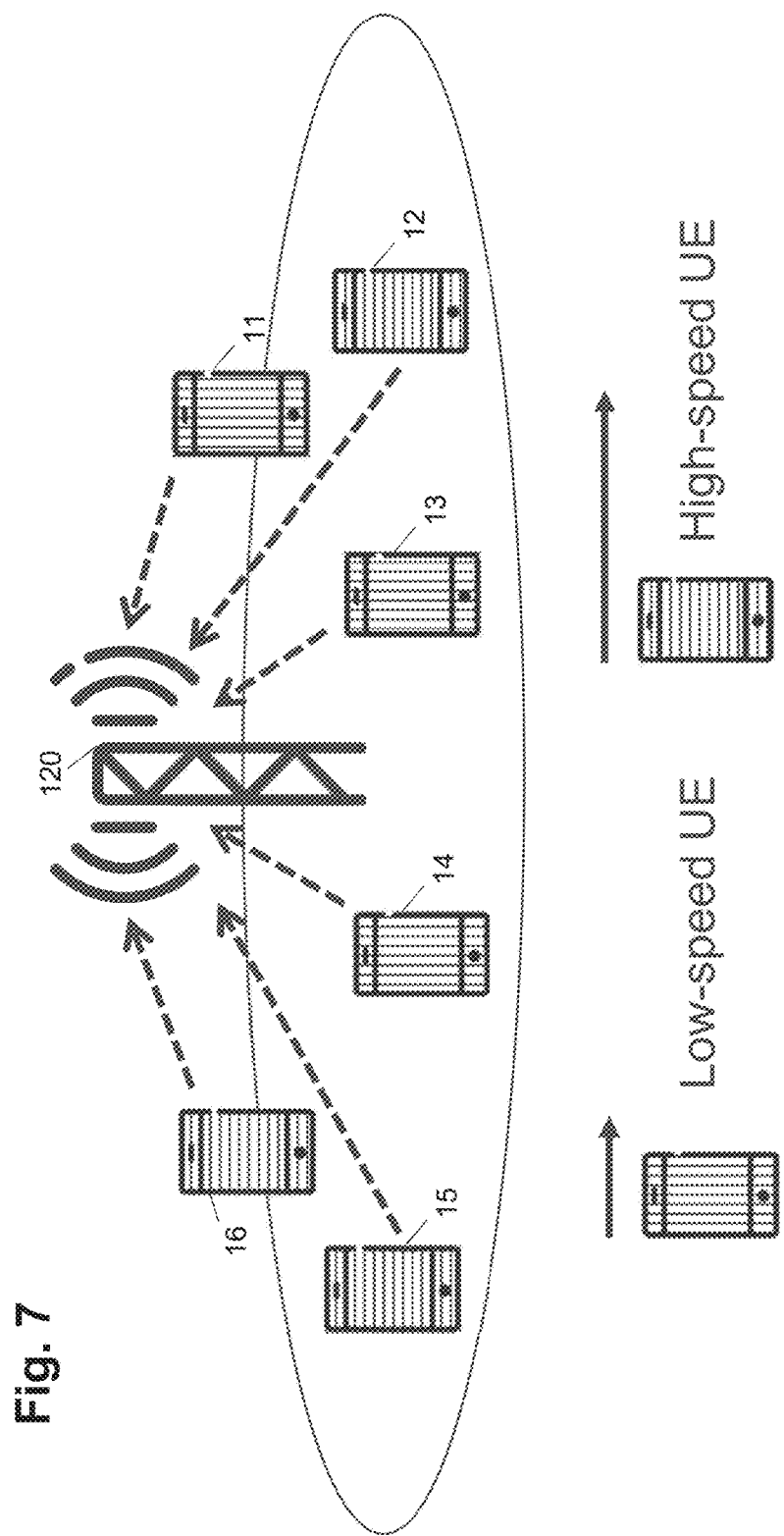
FIG. 7 shows an exemplary embodiment of a single cell MIMO system serving radio terminals with different speeds of movement.

FIG. 7 illustrates a massive MIMO scenario. All the radio terminals 11, 12, 13, 14, 15, 16 may send own CSI via SRS at the beginning of the coherence interval. Alternatively, the radio terminal 11, 12, 13, 14, 15, 16 may send the SRS and the network node 110, 120, 130, 140 may receive the SRS and determine the CSI. The radio network node 110, 120, 130, 140 may collect this information and may estimate a Doppler spread of each radio terminal 11, 12, 13, 14, 15, 16. Assume having two radio terminal categories: (i) low-speed radio terminal 11, 13, 14, i.e., pedestrian; (ii) high-speed radio terminal 12, 15, 16, i.e., vehicular.

Figure 8:
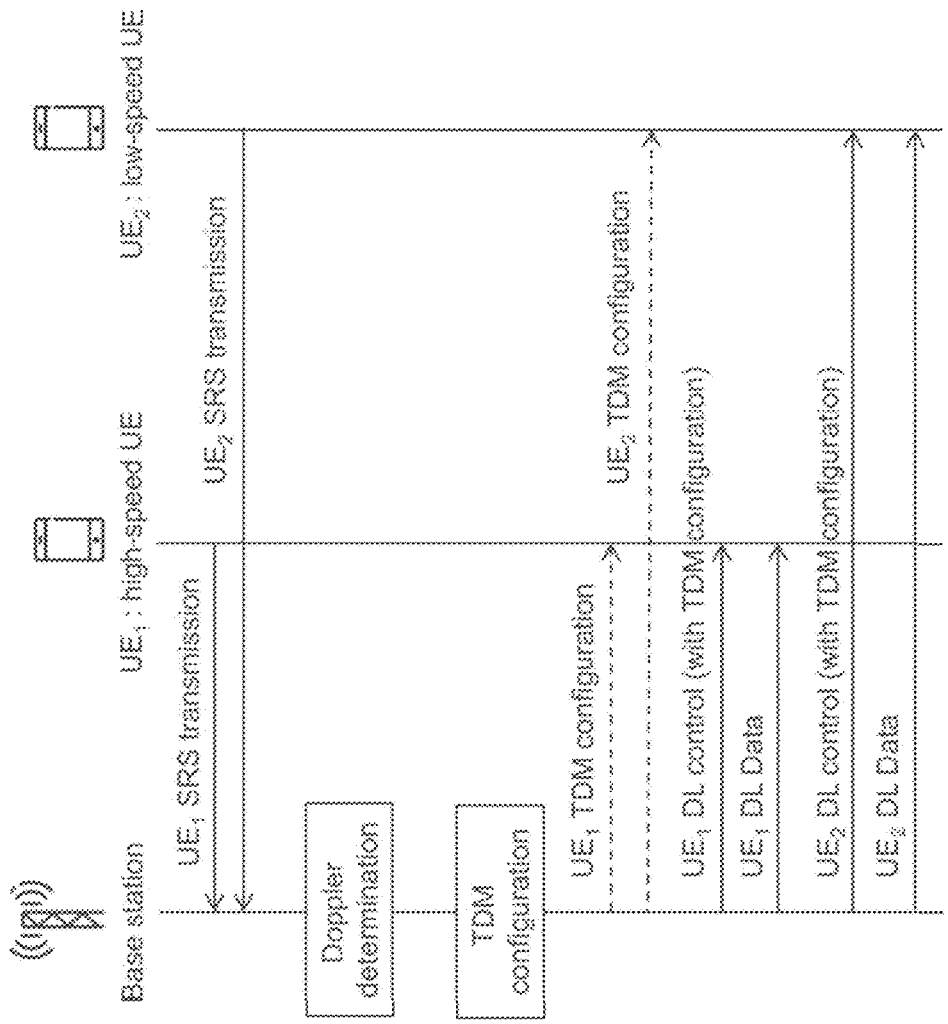
FIG. 8 shows an exemplary embodiment of the present invention in which the radio network node estimates the speed of the movement of served radio terminals.

FIG. 8 shows an exemplary embodiment of the present invention in which the radio network node 110, 120, 130, 140 estimates the speed of the movement of served radio terminals 11, 12, 13, 14, 15, 16.

According to one embodiment of the present invention the radio network node groups the radio terminals 11, 12, 13, 14, 15, 16, also referred to as UEs in the following, to corresponding categories, and computes the optimal TDM configuration, i.e., the optimal switching symbol x, by solving the following problem, $$\max_{x} S = \sum_{k=1}^{K} \mathcal{R}_k$$

$$\text{s.t.} \ f(x) \leq c,$$

where S is the downlink sum-rate, i.e., the sum of the DL achievable rates for the K users, and f(x)≤c represents the resource constraint, such as coherence time interval constraint, spectrum constraint, power constraint, etc.

Once the optimal switching symbol is computed, the BS communicates the TDM configuration to the high-speed UEs. Basically, this control signaling conveys information about the time intervals in which UEs may be in connected/idle mode, within a DL TTI. Lastly, radio network node 110, 120, 130, 140 may perform data transmission.

The same procedure may be repeated for the low-speed UEs at the switching symbol time where high-speed UEs move to the idle mode and low-speed UEs become active. This may guarantee lower power consumption at the UE side with respect the reference model.

Figure 9:
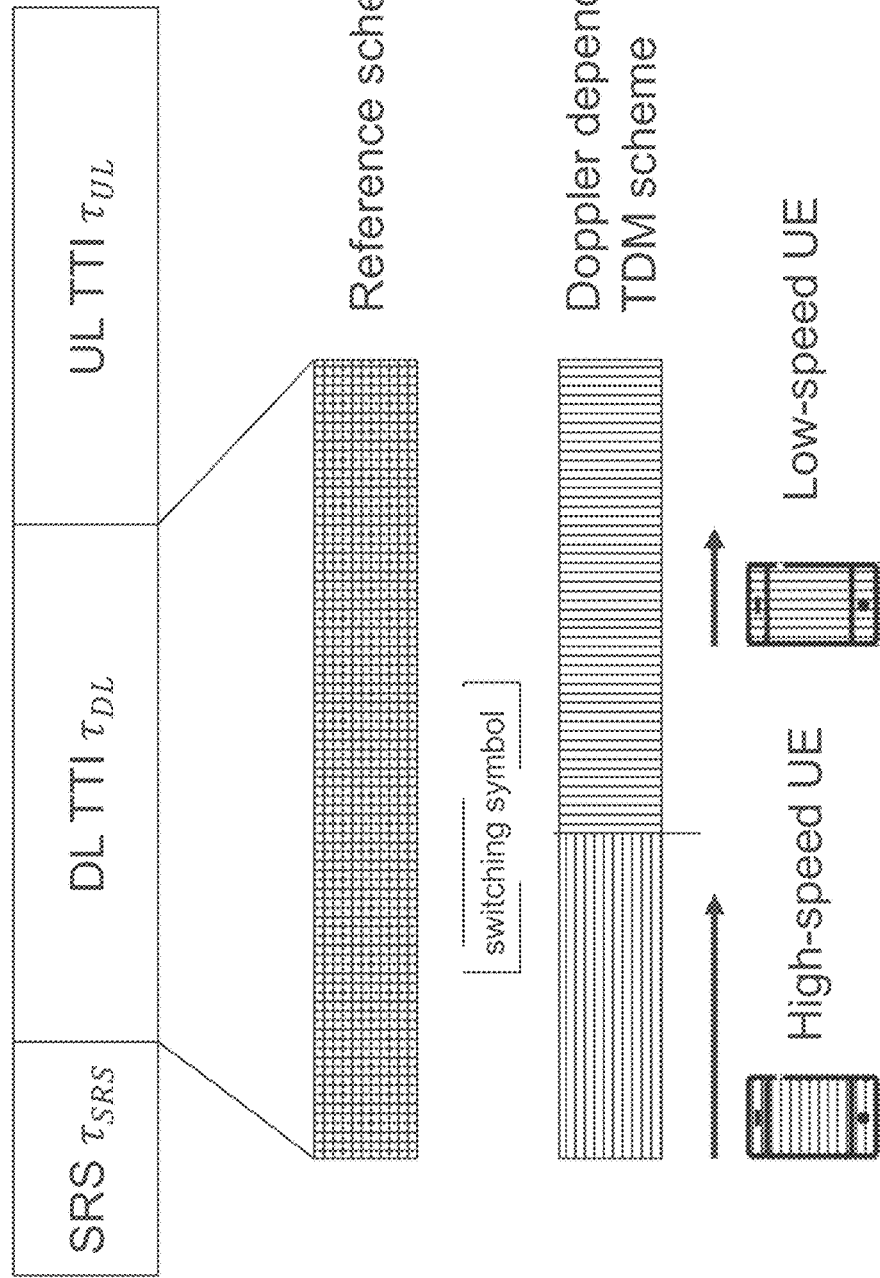
FIG. 9 shows an exemplary frame structure and a comparison of the resource allocation between a reference signaling and a method according to one embodiment of the present invention.

FIG. 9 shows an exemplary frame structure and a comparison of the resource allocation between a reference signaling and a method according to one embodiment of the present invention.

According to the prior art, all the radio terminals 11, 12, 13, 14, 15, 16 are served at the same time. In this case, low SRS periodicity, such as 1 SRS per coherence interval, may lead high-speed radio terminals 11, 12, 13, 14, 15, 16 to experience SINR degradation due to the CSI-T aging.

On the other hand, adopting a high SRS periodicity or equivalently sizing the frame equal to the coherence interval imposed by high-speed radio terminals 11, 12, 13, 14, 15, 16, leads to higher SRS overhead. Both cases reduce the DL sum-rate. FIG. 9 shows an example of frame structure and the resource allocation comparison between reference signaling and a method according to the present invention, also referred to as a Doppler dependent scheme.

According to one embodiment of the present invention time multiplexing of users combined with lower SRS periodicity may provide different benefits compared to methods of the prior art.

That is, for instance a higher DL sum-rate. Since each user may experience higher SINR when active. Indeed, splitting the radio terminals 11, 12, 13, 14, 15, 16 in two sub-groups served in different times may increase the DL power of the radio terminals 11, 12, 13, 14, 15, 16 when they are active. This may significantly reduce the interference among users due to more accurate channel pre-coding.

Further that is for instance lower SRS overhead. Since a radio network node 110, 120, 130, 140 can perform SRS acquisition once per coherence interval of the low speed radio terminals 11, 12, 13, 14, 15, 16, without performance degradation. The required SRS interval thus may depend on the speed of the low-speed radio terminals 11, 12, 13, 14, 15, 16.

Further yet, that is for instance lower radio terminal power consumption. Since during the time-frequency resources, i.e. symbols, assigned to a certain radio terminal category, the radio terminals 11, 12, 13, 14, 15, 16 belonging to the other one are in idle mode. Radio terminals 11, 12, 13, 14, 15, 16 may spend less time transmitting SRS and less time receiving DL data.

In the following an example is described detailing the benefits of the present invention over the prior art.

Considered a massive MIMO system where a BS equipped by M antennas simultaneously may serve K single-antenna equipped radio terminals (M>K), in the same frequency band, by operating in TDD mode. The time-frequency resources may be divided into coherence intervals (frames) of length T symbols.

The coherence interval may be the interval during which the channel can be reasonably viewed as time-invariant. The TDD coherence interval may be divided into three phases: uplink training, i.e. SRS transmission, downlink payload data transmission, i.e. DL TTI, and uplink payload data transmission.

Let $\tau_{SRS}$ be the number of symbols per coherence interval spent on transmission of uplink SRS, $\tau_{DL}$ the number of samples per coherence interval spent on transmission of downlink payload data, and $\tau_{UL}$ the number of samples per coherence interval spent on transmission of uplink payload data. The symbol length of the coherence interval $\tau$ is given by $\tau = \tau_{SRS} + \tau_{DL} + \tau_{UL}$, where $\tau_{DL} = \tau_{UL}$. Lastly, assume the TTI symbol length equal to $\tau_{DL}$ imposed by low-speed users.

Figures 10, 11:
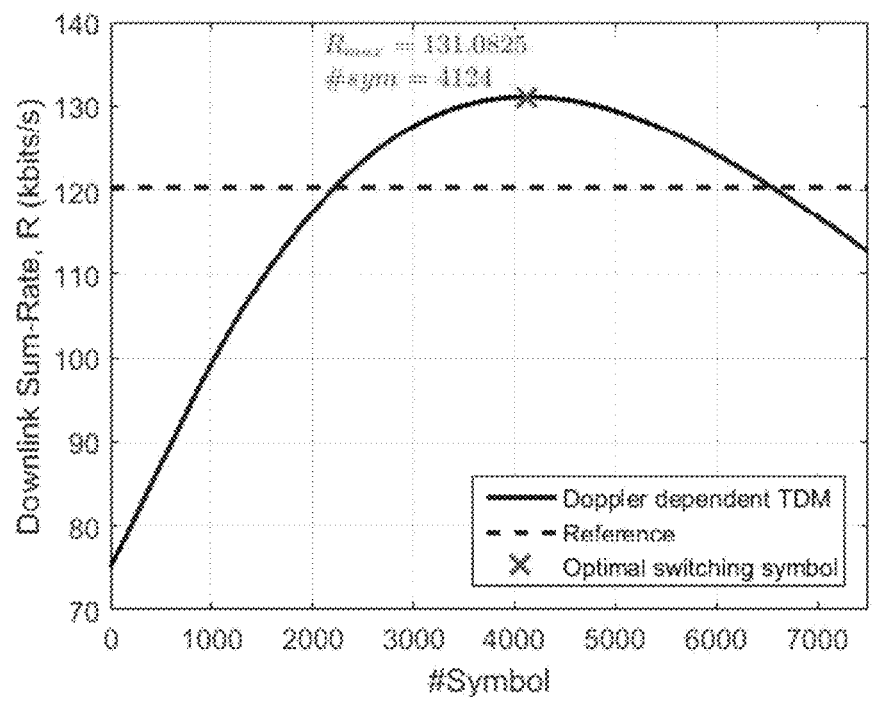
FIG. 10 shows a comparison between a reference signaling and a method according to one embodiment of the present invention.
FIG. 11 shows basic parameters for a simulation.

FIG. 11 shows basic parameters for a simulation. The simulation aims at comparing the performance, in terms of sum-rate, obtained by using the method according to the present invention and the prior art method. The simulation parameters are listed in FIG. 11, here SNR may be the single user SNR prior to power sharing for MU-MIMO.

According to the method according to the prior art, all the users are served by the BS during the TTI. The sum-rate is affected by the SINR degradation experienced by the high-speed users due to their shorter coherence interval.

By contrast, according to the present invention, the TTI may be split in two parts. High-speed users and low-speed users may be exclusively served in the first part and in the second part, respectively. The switching symbol, i.e. the symbol where low-speed radio terminals 11, 12, 13, 14, 15, 16 start to be served, may be properly computed by maximizing a sum-rate.

FIG. 10 shows the downlink sum-rates provided by the method according to the prior art and the method according to the present invention, named Doppler dependent TDM. In this particular simulation, i.e. example, by selecting the symbol 4124 as switching symbol, performance can be improved up to 9% over the conventional scheme.

FIG. 10 shows a comparison between a reference signaling and a method according to one embodiment of the present invention.

Note that the example provided above may be highly unfair to the method according to the present invention and if we enforce a rank-limitation of the transmitted signal the proposed solution may provide even better performance relative the power-sharing solution of the prior art.

In the example above, when all radio terminals 11, 12, 13, 14, 15, 16 are transmitting, consider 10 high speed radio terminals and 10 low speed radio terminals, it is essentially a channel transmission rank of 20. According to the present invention it may first be transmitted to the 10 high speed radio terminals and then to the 10 low speed radio terminals and it is essentially a channel transmission rank of only 10. Still the method according to the present invention outperforms a State of the art (SOTA) solution. In addition, for example, pilot overhead would increase and SINR decrease due to increased interference if transmission rank 20 was used.

Consider a rank-limitation of e.g. 10 in the base station hardware then in the SOTA solution one would only be able to serve half of the radio terminals 11, 12, 13, 14, 15, 16, effectively reducing the sum-rate of the SOTA solution with 50% while not at all affecting the proposed solution. With such a comparison the method according to the present invention may provide significantly more than 100% gain compare to the, SOTA solution.

Although detailed embodiments have been described, these only serve to provide a better understanding of the invention defined by the independent claims and are not to be seen as limiting.

By time multiplexing high and low speed users in the downlink (DL) transmission time interval (TTI) it is possible to use a lower SRS periodicity resulting in lower SRS overhead. More specifically, high-speed radio terminals 11, 12, 13, 14, 15, 16 may be assigned the channel early in the DL TTI, while low-speed radio terminals 11, 12, 13, 14, 15, 16 may be served during the remaining part of the DL TTI.

High-speed user channel conditions may change very quickly and their performance may be deeply affected by the CSI accuracy at the radio network node 110, 120, 130, 140. For this reason, high-speed users may need to be served next to the SRS acquisition at the BS.

By contrast, low-speed radio terminal channel conditions may stay approximatively constant during a DL TTI, due to their larger experienced coherence time interval. As a consequence, CSI-T accuracy at the radio network node 110, 120, 130, 140 may be good for low-speed radio terminals, even at the end of the DL TTI. Hence, serving low-speed radio terminals 11, 12, 13, 14, 15, 16 at the end of the DL TTI may not implicate performance degradation.

By solving an optimization problem, we provide the optimal configuration of resources allocation which maximizes the DL sum-rate.

The invention claimed is:

1. A method of assigning a transmission timing to a radio terminal in a radio network system including at least a radio network node and a radio terminal and employing a time division duplex method dividing a transmission time in an uplink transmission time interval and a downlink transmission time interval for transmission between the radio network node and the radio terminal, comprising the following steps:
   determining a speed of movement of the radio terminal with respect to the radio network node;
   grouping radio terminals based on the determined speed of movement into at least two groups; and
   assigning to the radio terminal a transmission timing in the downlink or uplink transmission time interval, wherein, for each group, the same transmission timing is assigned to the radio terminals within that group.

2. The method according to claim 1, wherein in assigning to the radio terminal the transmission timing, the higher the speed of movement of the radio terminal, the earlier is the transmission timing within the downlink or uplink transmission time interval.

3. The method according to claim 1, wherein in assigning to the radio terminal the transmission timing, the radio terminal with a speed of movement lower than a threshold is assigned a transmission timing throughout the entire downlink or uplink transmission time interval.

4. The method according to claim 1, wherein in assigning to the radio terminal the transmission timing, the higher the speed of movement of the radio terminal, the closer the transmission timing for reference signals is to the transmission timing of the downlink transmission timing.

5. The method according to claim 1, wherein in assigning to the radio terminal the transmission timing, the radio terminal with a speed of movement lower than a threshold is assigned a transmission timing for uplink reference signals throughout the entire uplink transmission time interval.

6. The method according to claim 1, wherein the radio network system is a Multiple-Input Multiple-Output system and the method further includes:
   employing a time division duplex method dividing the transmission time in the uplink transmission time interval and the downlink transmission time interval for transmission between the radio network node and the radio terminal.

7. The method according to claim 1, wherein the speed of the radio terminal is determined using an uplink transmission from the radio terminal to the radio network node.

8. The method according to claim 1, wherein the speed of the radio terminal is determined using a shift in a transmission signal.

9. The method according to claim 1, further including the step of comparing the determined speed of movement with a threshold, and assigning the transmission timing based on the comparison.

10. The method according to claim 1, wherein the network node sends more downlink reference signals to the radio terminal with a high speed of movement compared to the radio terminal with a low speed of movement.

11. A radio network node for a radio network system including at least the radio network node and a radio terminal and employing a time division duplex method dividing a transmission time in an uplink transmission time interval and a downlink transmission time interval for transmission between the radio network node and the radio terminal, the radio network node being adapted to:
   determine a speed of movement of the radio terminal with respect to the radio network node;
   group radio terminals based on the determined speed of movement into at least two groups; and
   assign to the radio terminal a transmission timing in the downlink or uplink transmission time interval, wherein, for each group, the same transmission timing is assigned to the radio terminals within that group.

12. A radio terminal for a radio network system including at least a radio network node and the radio terminal and employing a time division duplex method dividing a transmission time in an uplink transmission time interval and a downlink transmission time interval for transmission between the radio network node and the radio terminal, the radio terminal adapted to:
   receive an assigned transmission timing;
   refrain from transmitting in the downlink transmission time interval until an assigned transmission timing;
   transmit only during the assigned transmission timing of the downlink transmission time interval; and
   refrain from transmitting in the remaining part of the downlink transmission time interval,
   wherein radio terminals are grouped based on the determined speed of movement into at least two groups, the same transmission timing being applied for radio terminals within one group.

* * * * *